United States Patent [19]

Yoshida

[11] Patent Number: 4,555,345
[45] Date of Patent: Nov. 26, 1985

[54] METHOD OF TREATMENT FOR SEPARATION OF OIL FROM OIL-CONTAINING SLURRY WASTE

[75] Inventor: Tadayuki Yoshida, Fukuoka, Japan

[73] Assignees: Sankyo Yuki Kabushiki Kaisha, Fukuoka; Arai Shoji Kabushiki Kaisha, Hiratuka, both of Japan

[21] Appl. No.: 709,365

[22] Filed: Mar. 11, 1985

Related U.S. Application Data

[63] Continuation of Ser. No. 596,576, Apr. 5, 1984, abandoned, which is a continuation of Ser. No. 336,320, Dec. 31, 1981, abandoned.

[30] Foreign Application Priority Data

Jan. 22, 1981 [JP] Japan .................................... 56-7140
Jun. 19, 1981 [JP] Japan .................................... 56-93942

[51] Int. Cl.⁴ ............................ C02F 1/24; C02F 1/52
[52] U.S. Cl. .................................... 210/705; 210/710; 210/738
[58] Field of Search ................................ 210/703–705, 210/708, 710, 721, 727, 728, 737, 738, 910

[56] References Cited

U.S. PATENT DOCUMENTS

| | | | |
|---|---|---|---|
| 3,203,893 | 8/1965 | House et al. | 210/910 |
| 3,677,940 | 7/1972 | Fujimoto et al. | 210/705 |
| 3,707,464 | 12/1972 | Burns et al. | 210/737 |
| 3,884,803 | 5/1975 | Traylor | 210/704 |

*Primary Examiner*—Ivars Cintins
*Attorney, Agent, or Firm*—Stevens, Davis, Miller & Mosher

[57] ABSTRACT

An oil-containing slurry waste containing a soap component in the oil component thereof is foamed by stirring so that the oil component adheres to the froth produced by the foaming and rises to the surface of the slurry waste by virtue of buoyancy. Consequently, the oil component in the slurry waste is separated from the slurry waste in a highly concentrated form as entrained by the froth. The oil thus separated is suitable for reuse. The slurry waste having a low oil content can be easily treated for disposal.

17 Claims, 9 Drawing Figures

FIG. 7A

METHOD OF TREATMENT FOR SEPARATION OF OIL FROM OIL-CONTAINING SLURRY WASTE

This application is a continuation of application Ser. No. 596,576, filed Apr. 5, 1984 now abandoned, which in turn is a continuation of Ser. No. 336,320, filed Dec. 12, 1981, now abandoned.

BACKGROUND OF THE INVENTION

This invention relates to a method of treatment for the separation of oil from an oil-containing slurry waste such as, for example, ordinary wastes such as sewage sludges, human and animal excrements, and household wastes and industrial organic effluents such as effluents from food processing plants and effluents from wool scouring plants. The term "oil" as used in this specification shall mean oils and fats, mineral oils, and compounds thereof.

Heretofore, such a slurry waste as mentioned above has been treated by first being dehydrated to some extent and subsequently disposed of in a reclaimed land or burnt in an incinerator. Disposal in the reclaimed land has become increasingly more difficult from the standpoint of the preservation of a healthy environment while disposal in the incinerator has entailed consumption of huge energy. These conventional methods of treatment for the disposal of a slurry waste, therefore, have reached the limit.

To cope with the difficulties, it has been proposed to ferment slurry wastes thereby converting them into fertilizers and other articles of financial worth or at least into articles which can be discarded without entailing the problem of environmental pollution.

Unfortunately, the oil contained in various forms in the slurry waste renders such fermentative treatments extremely difficult. To be specific, the oil contained in the slurry waste notably impairs the efficiency of the removal of water from the slurry waste. Unless a dehydration assistant or moisture content regulator is added in a large amount to the slurry waste being treated, the water content of the slurry waste cannot be sufficiently lowered to the level befitting the fermentative treatment. Moreover, the oil directly obstructs the activities of microorganisms used for the fermentative treatment and consequently renders the fermentation difficult. Incidentally, the sewage sludges of the closed-flow system contain 5 to 20 percent oil, those of the combined-flow system 10 to 15 percent oil, and the household wastes as much as 45 percent or thereabout oil. The effluents from wool scouring plants contain about 40 percent oil and the human excrements about 25 percent oil.

The disposal of such a slurry waste as described above is generally accomplished by at least partly separating the suspended solid particles from the slurry waste through sedimentation and subjecting the resultant supernatant to an activated sludge method or to a bio-oxidation treatment. These treatments, however, are adversely affected to a great extent by the oil contained in the slurry waste. In the case of the activated sludge method, for example, the oil in the slurry waste is adsorbed by and deposited in the form of a coat on the active floc which is the vital agent for the treatment. The deposited coat of oil degrades the active floc's adsorbing capacity, retards the decomposition of waste by the activated sludge, and consequently impairs the treatment of the slurry waste as a whole. In the case of the bio-oxidation treatment, the oil in the slurry waste adheres to the microorganisms responsible for the bio-oxidation and intercepts the respiration of the microorganisms to deprive them of activity and entail the phenomenon of bulking. Consequently, the bio-oxidation is retarded and the treatment is impaired as a whole. In the other methods of treatment, the oil in the slurry waste adheres to the mechanical parts and vessels and consequently causes mechanical troubles and impairs operational efficiency.

The adverse effects which the oil in slurry waste produces in the treatment of a slurry waste as described above could be fully eliminated if the oil contained in the slurry waste was made to sediment amply in conjunction with the suspended solid particles during the sedimentation of these solid particles. When this combined sedimentation is actually carried out; however, the total amount of oil to be separated from the slurry waste increases and the disposal of the slurry waste becomes all the more difficult. Consequently, the improved disposal of slurry waste cannot be attained as desired. The separation of oil from the slurry waste does not merely facilitate the disposal of the slurry waste itself but also counts for much from the standpoint of the efficiency of sewage disposal.

The treatment for the separation of oil from the slurry waste entails the following problems. The first problem is how the oil mingling in various forms in the slurry waste together with large amounts of water and impurities is to be isolated. If the oil in the slurry waste is isolated and recovered in a fairly high yield from the slurry waste, the second problem is how the isolated oil entraining large amounts of water and impurities is to be effectively disposed of. Because these problems remain unsolved, efforts are made to minimize the amount of oil which mixes with sewage sludges by encouraging observance of regulations on the release of wastes. According to the regulations, any waste containing a large amount of oil is not allowed to be released into the sewage system until it is deprived of oil suspended and accumulated in a separate oil layer and subsequently diluted with water.

SUMMARY OF THE INVENTION

The primary object of this invention is to provide a method which permits very easy disposal of an oil-containing slurry waste by foaming the oil-containing slurry waste containing a soap component in the oil component. This allows the oil to adhere to the resultant froth rising by buoyancy to the surface of the slurry waste. The floating froth entraining the oil is then removed from the slurry waste.

The second object of this invention is to provide a method which produces fuel oil from the water-containing oil separated in the form of froth by the method described above by heating this water-containing oil. Heating causes the oil compound present therein thermally decompose so that oil is produced and the entrained water is evaporated.

The third object of this invention is to provide a method which further enhances the efficiency of separation of oil from the oil-containing slurry waste by adding a saponifying agent to the slurry waste thereby saponifying the oils and fats liberated in the slurry waste and subsequently enhancing the separation of the oil from the slurry waste by a flotation treatment.

The fourth object of this invention is to provide a method which facilitates the decomposition of the oil compound and the evaporation of the water during the heating of the separated water-containing oil by dehydrating the water-containing oil separated by the flotation treatment mentioned above.

The fifth object of the present invention is to provide a method which adds to the economic value of the fuel oil mentioned above by additionally heating the fuel oil resulting from the decomposition of the oil compound and the evaporation of water thereby anaerobically carbonizing the organic component thereof.

The other characteristics and advantages of the present invention will become apparent from the further disclosure of the invention to be given below.

DETAILED DESCRIPTION OF THE INVENTION

The invention will be described first with reference to the process diagram of FIG. 1.

In this diagram, 1 denotes a storage tank for a slurry waste subjected to the treatment. The slurry waste to be treated by the method of this invention contains oil. Examples of the oil-containing slurry waste effectively treated by the method of this invention include ordinary wastes such as sewage sludges, human and animal excrements, and household wastes and industrial organic effluents such as effluents from food processing plants and effluents from wool scouring plants.

The slurry waste placed in the storage tank 1 is forwarded to a preliminary reaction tank 2, in which a saponifying agent brought in from a saponifying agent tank 3 is added to the slurry waste. By the addition of the saponifying agent, part of the free oils and fats contained in the slurry waste are saponified. The slurry waste now containing soap in consequence of the saponification is forwarded to a flotation unit 4. In the flotation unit 4, the soap-containing slurry waste is foamed by agitation. Consequently, the remaining free oils and fats and other oil components are caused to adhere to the resultant froth rising by buoyancy to the surface of the slurry waste. On reaching the surface of the slurry, the froth containing oil in a large amount is separated from the slurry.

The addition of the saponifying agent in the preliminary reaction tank 2 is intended to aid in the separation of oil by the agitational foaming by the flotation unit 4. There is no need to make this addition where the slurry waste subjected to the treatment contains a large amount of soap or a component equivalent to a saponifying agent from the beginning. In the case of free oils and fats which are adhered to or adsorbed on coarse solid particles, their separation by flotation is difficult to attain because they are sedimented as entrained by the coarse solid particles during the flotation treatment. It is desirable in this case to add the saponifying agent to the slurry waste so as to saponify the free oils and fats and allow the resultant soap to rise, as entrained by the froth, to the surface of the slurry waste.

During the flotation treatment in the flotation unit 4, the inorganic components and the coarse organic components remain substantially wholly in the slurry portion and are separated from the froth portion. Since the oil has risen to the surface as entrained by the froth, the slurry portion which remains below has a very low oil content and therefore can be easily disposed of safely by the treatment of the nature given to ordinary slurry waste free from oil. This is because the slurry portion has acquired an increased capacity for dehydration and, therefore, can be dehydrated, to the level of a water content which quite suits the following treatment, in the dehydration unit 5 without requiring the presence of an appreciably large amount of a dehydration assistant. When the slurry portion is in this condition, the fermentative treatment can be performed advantageously thereon to produce particularly desirable results. When the slurry waste, freed from the oil in the flotation unit 4, as described above, is subjected to aerobic fermentation, the product of this treatment can be used as, for example, a fertilizer. Otherwise, the product may be used in filling up reclaimed land to afford a stable foundation for the reclaimed land. Even when a given slurry waste happens to contain a large amount of oil, the oil can be removed in a high proportion from the slurry waste by the flotation treatment of this invention. The oil which escapes this separation by the flotation treatment and remains dissolved in the supernatant can be sedimented by the addition of a saponifying agent during the initial sedimentation. Consequently, the resultant slurry portion becomes readily disposable.

The water-containing oil which passes into the froth during the treatment in the flotation unit 4 accounts for about 40 percent of the total slurry waste in the case of the closed-flow type sewage sludge. It is noted that this oil content is very high as compared with the oil content of 11 to 13 percent found in soybeans and the oil content of 13 to 15 percent found in sardines, which generally form the raw materials for the production of oils and fats. According to the present invention, therefore, the water-containing oil separated as described above can be easily converted into fuel oil by the treatment to be described more fully afterward.

The water-containing oil component which is withdrawn in the form of froth from the flotation unit 4 is forwarded to the pressure heater 6, there to be heated under application of pressure. By the heating under the pressure, the oil and fat compounds and other oleic type compounds present in the separated water-containing oil component are decomposed and liberated in the form of oil as mixed with free oils and fats and mineral oils originally contained in the separated water-containing oil component. The separated water-containing oil component, in which the free oil content has been increased by the thermal treatment under pressure, is further forwarded to the evaporator 7 where heating for the removal of water occurs. The oil component now free from the water content is accumulated in the oil tank 8. In the residue which remains after the removal of the water content in the evaporator 7, the oil component is substantially in the form of free oil. It is a mixture consisting of the free oil in the main, the solid component extracted as entrained by the froth during the flotation treatment, and a small amount of residual water. Since substantially all the inorganic substances are removed during the flotation treatment, the solid component in this mixture is formed practically wholly of organic substances, which can be disposed by combustion. Thus, the residue occurring after the removal of the water content in the evaporator 7 can be directly incinerated. This residue, which would otherwise be disposed wastefully, can be utilized advantageously as a fuel for the sludge boiler 9, a heat source for the pressure heater 6 and the evaporator 7.

The saponifying agent to be used in the present invention is only required to satisfy the condition that it should react with oils and fats and consequently produce soap. It may be a metal salt, a metal oxide, a metal hydroxide, for example. Concrete examples of the saponifying agent satisfying the condition include calcium chloride, magnesium sulfate, aluminum chloride, sodium carbonate, sodium phosphate, iron oxide, zinc oxide, potassium hydroxide, sodium hydroxide, and calcium hydroxide. In the case of the present invention where the reaction between the saponifying agent and the oils and fats is believed to proceed in an equimolar ratio, it is desirable from the economic point of view to use a saponifying agent having as low a molecular weight as permissible. From the standpoint of the foaming property, the saponifying agent is desired to possess a highly electrolytic property and a high degree of dissociation. Further to permit ready decomposition of the soap produced by the addition of the saponifying agent during the decomposition of the oleic type compounds in the pressure heater 6, the metal component of the saponifying agent is desired to possess a weak binding force with oils and fats. Generally, potassium hydroxide and sodium hydroxide prove to be the best choices of all the saponifying agents available.

As already pointed out, no particular addition of the saponifying agent is required when the slurry waste subjected to the treatment contains an ample amount of soap or component equivalent to a saponifying agent from the beginning. To ensure a thorough conversion of free oils and fats into soap and an ample enhancement of the yield of oil during the flotation treatment, it is desirable to add the saponifyig agent generally in an amount of 1/30 to 1/100, preferably 1/60 to 1/70 (part by weight) based on the weight of the organic substances present in the slurry waste. The amount of saponifying agent varies more or less with the amount of the free oils and fats contained in the slurry. When the soap content in the slurry waste under treatment is excessively low, the slurry waste is foamed insufficiently during the flotation treatment and the desired separation of the oil component by virtue of the rise of the froth cannot be obtained. When the saponifying agent is added excessively, not only the oil component but also the dissolved component contained in the slurry waste under treatment is coagulated to a large proportion and the oil recovered in the form of froth comes to contain large proportions of impurities. During the decomposition of the oleic type compounds in the pressure heater 6, the amount of oil and fat compounds which inevitably remain in an unaltered form tend to increase. Consequently, the oil finally obtained cannot be readily utilized as fuel oil. In the treatment of the slurry waste which contains a particularly large amount of soap component or a component equivalent to the saponifying agent, adding an acid such as hydrochloric acid to the slurry waste in advance of the treatment in the pressure heater 6 brings about an advantageous result. This addition of acid facilitates the decomposition of the oleic type compounds during the formation of oil in the pressure heater 6 and, therefore, permits the formation of oil to proceed under desirable conditions. The amount of the acid thus added is desired to be such that the oil formed during the thermal treatment under the pressure will assume a pH value in the neighborhood of neutrality. The desirable result of the addition of the acid may be logically explained by a postulate that the soap component present in an excess amount is decomposed by the added acid to a point where the thermal decomposition of the oleic type compounds becomes easy proportionally.

In the preliminary reaction tank 2 or the flotation unit 4, a small amount of ferric chloride, higher alcohol, foaming agent, etc. may be added to the slurry waste for the purpose of aiding in the formation of a metal salt as a saponifying agent, which enhances the adhesion of the oil component to the froth, and improves the foaming property of the slurry waste. Two or more saponifying agents selected from among the aforementioned metal salts, metal oxides, and metal hydroxides may be used jointly. These additives may be mixed in advance within the saponifying agent tank 3 or they may be incorporated into the slurry waste within the flotation unit 4. Optionally, may be forceably incorporated air into the slurry waste while the slurry waste is being stirred for foaming in the flotation unit 4.

Although the decomposition of the oleic type compounds in the pressure heater 6 may be attained to some extent by heating the separated water-containing oil under atmospheric pressure, it can be obtained without fail by effecting this heating under increased pressure. In the evaporation of the separated water-containing oil in the evaporator 7, the thermal energy require for the vaporization of water can be decreased by lowering the pressure in the evaporator. This can be achieved by using a multiple effect evaporator such as the triple effect evaporator illustrated in FIG. 1.

The decomposition of the oleic type compounds in the pressure heater 6 and the evaporation of the water-containing oil for the removal of water in the evaporator 7 are not necessarily carried out in the order mentioned. The process may be changed so that the decomposition of the oleic type compounds will be made after removal of the water. Since the evaporator 7, when operated under a decreased pressure, permits the evaporative removal of water from the water-containing oil to be thoroughly effected at a relatively low temperature, it is more desirable from the standpoint of efficient use of thermal energy to carry out the removal of water after the decomposition of the oleic type compounds. In the majority of cases, the oil formed in the process effecting the water removal after the decomposition of the oleic type compounds generally possesses higher viscosity than that obtained by reversing the order. To facilitate the handling of the oil thus produced, it is desirable to add petroleum or other similar high boiling oil to the separated water-containing oil prior to entry into the evaporator 7 so that the oil finally obtained will acquire fluidity. This additive oil is desired to possess a boiling point of at least 200° C., preferably over 250° C. This prevents the diffusion of gases when heat is applied. The amount of the additive oil to be used, though variable with the water content in the separated water-containing oil, is about 0.5 to 1.5 (by weight ratio) times the amount of the separated water-containing oil as in the case of the treatment illustrated in FIG. 1. The additive oil thus used in this invention is not wasteful because this additive oil is eventually utilized, in conjunction with the oil formed from treating the separated water-containing oil component and the organic solid substance entrained thereby, as a fuel. This fuel can be burnt in the sludge boiler 9 to produce the thermal energy used for the operation of the pressure heater 6 and the evaporator 7. The amount of the additive oil is extremely small as compared with that of the fuel oil to be used in the disposal of the slurry waste solely by incineration.

For effective operation of the pressure heater 6, the pressure and the temperature are desired to be at least 0.5 kg/cm$^2$ and 100° C. respectively. Particularly when the separated water-containing oil has a high water content and it is heated under pressure, the heating given at an excessively high temperature tends to impair rather than facilitate the formation of the oil due to the decomposition of the oleic type compounds. In this case, therefore, the heating is desired to be effected under the conditions of 105° to 120° C. and 0.5 to 3 kg/cm$^2$, preferably about 110° C. and about 2 kg/cm$^2$. This is possibly because, in the presence of a large amount of water, the thermal decomposition and saponification of the oil and fat compounds proceed in an equilibrated condition.

In the pressure heater 6 and the evaporator 7, the low boiling oil contained in the separated water-containing oil is liberated and dispersed in conjunction with the steam. The low boiling oil entrained in the steam should be collected as thoroughly as possible.

Now, the present invention will be described with reference to the experiment conducted by the inventor.

EXPERIMENT 1

Figure 2:
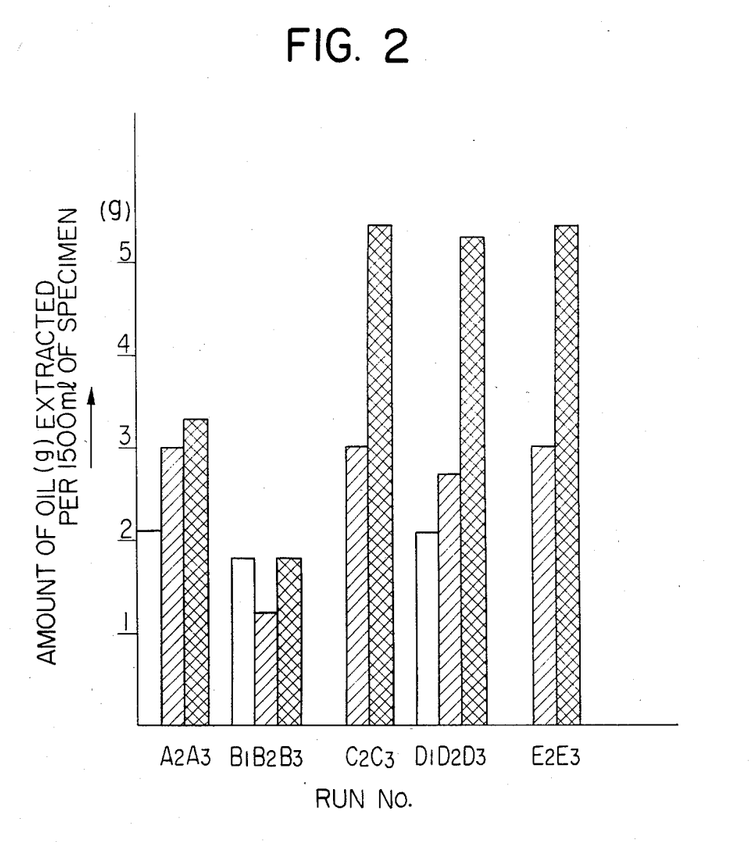
FIG. 2 is a graph showing the amount of oil produced as the function of the changes in the condition of addition of the saponifying agent and the condition of pressure and heat application as found in Experiment 1.

A first sedimentation sewage sludge having a dry sludge (D.S.) content of 3.4 percent and an organic substance content of 68.4 percent/D.S. was obtained as a sample. The specimen in each of the runs involved was first subjected to addition of a saponifying agent and then directly subjected to a thermal treatment under pressure, followed by the measurement of the amount of oil produced and recovered consequently. To find the effect of the addition of saponifying agent, addition of a saponifying agent was totally omitted in some runs, addition of KOH alone was made in some other runs, and separate addition of KOH and HCl in the order mentioned was made in the other runs. To find the effect of the thermal treatment under pressure, the thermal treatment was performed under different pressures and temperatures in the varying runs. The conditions for the treatment are shown in Table 1 and the results of the treatment are shown in FIG. 2.

TABLE 1

| Run No. | | Conditions for treatment |
|---|---|---|
| A2 | No addition of saponifying agent | The specimen was treated at 95° C. under atmospheric pressure for 30 minutes |
| A3 | | The specimen was treated at 110.8° C. under 0.5 kg/cm$^2$ of pressure for 10 minutes. |
| B1 | KOH was added in an amount of ⅛ (part by weight) of oranic substances contained in the specimen. | The specimen was treated at 60 to 70° C. under atmospheric pressure for 30 minutes. |
| B2 | | The specimen was treated at 95° C. under atmospheric pressure for 30 minutes. |
| B3 | | The specimen was treated at 110.8° C. under 0.5 kg/cm$^2$ of pressure for 10 minutes. |
| C2 | After the treatment of the preceding run (B), the specimen was adjusted to pH 6.6 by addition of HCl. | The specimen was treated at 95° C. under atmospheric pressure for 30 minutes |
| C3 | | The specimen was treated at 110.8° C. under 0.5 kg/cm$^2$ of pressure for 10 minutes |
| D1 | KOH was added in an amount of 1/64 (part by weight) of organic substances contained in the specimen. | The specimen was treated at 60 to 70° C. under atmospheric pressure for 30 minutes. |
| D2 | | The specimen was treated at 95° C. under atmospheric pressure for 30 minutes. |
| D3 | | The specimen was treated at 110 8° C. under 0.5 kg/cm$^2$ of pressure for 10 minutes |
| E2 | After the treatment of the preceding run (D), the specimen was adjusted to pH 6.6 by addition of HCl. | The specimen was treated at 95° C. under atmospheric pressure for 30 minutes. |
| E3 | | The specimen was treated at 110.8° C. under 0.5 kg/cm$^2$ of pressure for 10 minutes. |

EXPERIMENT 2

A first sedimentation sewage sludge having a D.S. content of 3.9 percent, an organic substance content of 55.2 percent/D.S., and an oil content of 6.4 g/1500 ml was obtained as a sample. Specimens involving different conditions of saponifying agent addition were subjected to a thermal treatment under pressure using fixed conditions of pressure and temperature with a view to determining the change in the recovery of the formed oil due to the change in the addition conditions of saponifying agent in the thermal treatment under pressure. The addition conditions of saponifying agent and the results are shown in Table 2 and FIG. 3.

TABLE 2

| Run No. | Condition of addition | Oil content in in froth (%) | Recovery ratio of oil (%) |
|---|---|---|---|
| F | No saponifying agent added. | 7.8 | 14.1 |
| G | The specimen was adjusted to pH 4.2 by addition of HCl. | 19.3 | 26.2 |
| H | The specimen, after addition of KOH in an amount of ⅛ (part by weight) based on organic substance content, was adjusted to pH 4.2 by addition of HCl. | 33.7 | 78.1 |
| I | The specimen, after addition of KOH in an amount of 1/64 (part by weight) based on organic substance content, was adjusted to pH 4.2 by addition of HCl. | 22.7 | 79.7 |
| J | The specimen, after addition of KOH in an amount of 1/64 (part by weight) based on organic substance content, was adjusted to | 24.3 | 79.7 |

TABLE 2-continued

| Run No. | Condition of addition | Oil content in in froth (%) | Recovery ratio of oil (%) |
|---|---|---|---|
| | pH 6.6 by addition of HCl. | | |

EXPERIMENT 3

A first sedimentation sewage sludge having a D.S. content of 3.9 percent and an organic substance content of 55.0 percent/D.S. was subjected first to addition of 1/64 (part by weight) of KOH based on the aforementioned organic substance content, and then to a flotation treatment. The water-containing oil separated consequently was used as specimens (400 cc each). The specimens were thermally treated at a fixed temperature of 110° C. under varying degrees of pressure to determine the change in the recovery of the formed oil due to the change in the pressure used in the thermal treatment. The results are shown in Table 3. In each run, the oil produced in consequence of the thermal treatment under pressure was isolated from the solid substances by use of benzine.

TABLE 3

| | Condition of treatment | | | |
|---|---|---|---|---|
| Item | 1 kg/cm² for 30 minutes. | 2 kg/cm² for 30 minutes. | 3 kg/cm² for 30 minutes. | Specimen |
| D.S. | 35,000 ppm (35 g/l) | 47,500 ppm (47.5 g/l) | 40,000 ppm (40 g/l) | 41,700 ppm (41.7 g/l) |
| Oil content (g/lit.) | 15.3 | 26.0 | 17.8 | 7.96 |
| Organic content (g/lit.) | 12.0 | 13.0 | 13.0 | 20.3 |

EXPERIMENT 4

Figure 4:
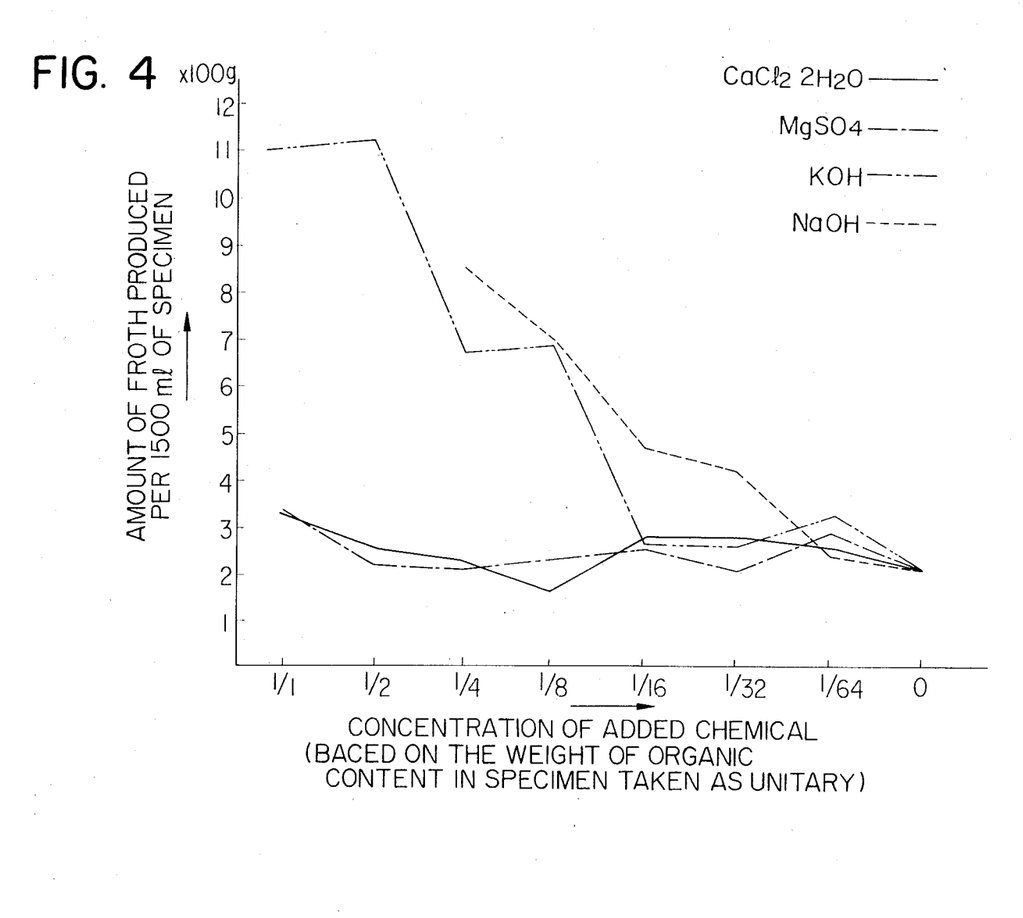
FIG. 4 is a graph showing the relation between the amount of addition of each saponifying agent and the amount of foam formed as found in Experiment 4.

A first sedimentation sewage sludge having a D.S. content of 3.9 percent and an organic substance content of 55.0 percent/D.S. was obtained as a sample. Specimens incorporating $CaCl_2 \cdot 2H_2O$, $MgSO_4$, KOH, and NaOH independently in varying amounts were treated by the process of this invention to find the relation between the amount of saponifying agent added and the amount of foam produced. The results are shown in FIG. 4.

Figure 3:
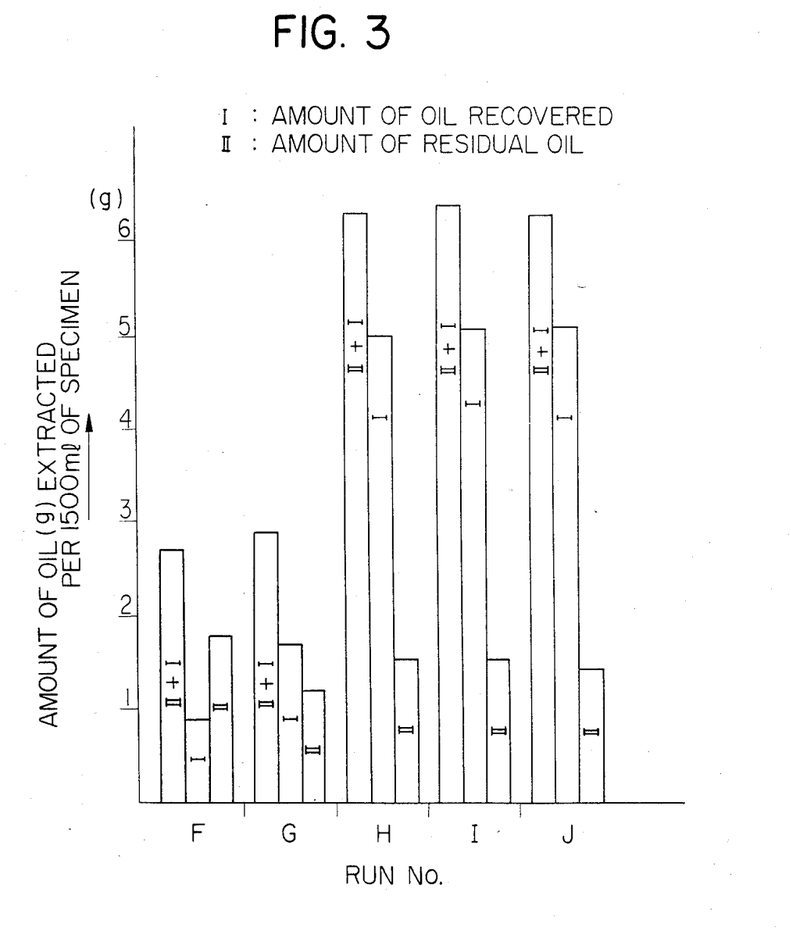
FIG. 3 is a graph showing the amount of oil produced as the function of the change in the condition of addition of the saponifying agent as found in Experiment 2.

A review of the results of Experiments 1 through 4 reveals that there exists a recognizable fixed ratio between the amount of the oil recovered and that of the oil concentrated and the effect that the addition of the saponifying agent reaches its peak when the amount of its addition is 1/64 (part by weight) based on the organic substance content in the slurry waste. Besides this effect of the addition of the saponifying agent, the effect of the thermal treatment under pressure is clearly recognized. The results also indicate that there exists no definite proportional relationship between the amount of the foam produced and the amount of the oil recovered and that excessive addition of saponifying agent adversely affects the extraction of the oil from the slurry waste. It is further noted from the results that when the alkali metal salt or metal hydroxide is incorporated in an excess amount, the excess additive does not interfere with the recovery of the oil so long as the additive is adjusted to a neutral pH zone by addition of an acid. When the treatment is carried out properly, at least about 80 percent of the oil content of the slurry waste can be recovered in the form of oil.

Now, the procedure by which the treatment described with reference to FIG. 1 can be carried out more efficiently will be described with reference to the process diagram of FIG. 5.

The portion of the treatment effected by the storage tank 1, the preliminary reaction tank 2, the saponifying agent tank 3, the flotation unit 4, the dehydrator 5, the pressure heater 6, the evaporator 7, the oil tank 8, and the sludge boiler 9 is the same as that which has already been described with reference to FIG. 1. The froth removed from the flotation unit 4 as described with reference to FIG. 1 is forwarded to the froth dehydrator 10. This froth dehydrator 10 has the shape of a column. The froth introduced upwardly through the lower end thereof rises up the column and reaches the upper end, through which it is discharged. During this ascent of the froth through the interior of this column, the water retained between the individual bubbles of the froth is made to fall to the bottom of the column to effect dehydration of the froth. Similarly a series defined by steps of the defoaming tank 11 through the dehydrator 14 effect flocculation-dehydration as described more fully afterward. This dehydration of the froth is intended to decrease the water content in the water-containing oil separated by the flotation treatment and lower the consumption of thermal energy in the pressure heater 6 and the evaporator 7 as much as possible. When the interior of the froth dehydrator 10 is maintained in a pressurized state, the diameter of the individual bubbles of the froth is decreased and the effect of the removal of water is increased.

The water-containing oil which departs in the form of froth from the froth dehydrator 10 is forwarded to the defoaming tank 11, where it is lightly stirred and defoamed. This defoaming tank 11 is intended to enhance the mixing property of the chemical agent used in the subsequent flocculation-flotation tank 12. The defoaming tank 11 may be omitted because required defoaming can be effected while the chemical agent is being mixed in the flocculation-flotation tank 12.

After departure from the defoaming tank 11, the separated water-containing oil portion is delivered to the flocculation-flotation tank 12. The flocculation-flotation tank 12 has its interior partitioned into three chambers 12a, 12b, and 12c. The chemical agents from the flocculant tanks 13a, 13b, 13c and 13d are added to the chambers 12a, 12b, and 12c respectively. To be specific, a flocculation assistant is added to the first chamber 12a, a known flocculant such as a metal salt or a high-molecular flocculant is added to the second chamber 12b, and a pH adjusting agent is added to the third chamber 12c.

Examples of the flocculation assistants to be added to the first chamber 12a include mixtures of hydrogen peroxide solution and metal salts of magnesium chloride, calcium chloride, magnesium sulfate, and sodium sulfate. The addition of this flocculation assistant is intended to convert the separated water-containing oil into an oxidized state by virtue of the nascent oxygen of hydrogen peroxide and allow the dissolved organic substances to be educed in the form of solid substances embracing the metal salt as the core. The amount of the flocculation assistant to be added is in the range of 500 to 1500 ppm based on the separated water-containing oil content.

The flocculant to be added to the second chamber 12b is known to the art as described above. Examples of metal salts include iron chloride, iron sulfate, and aluminum chloride. High-molecular flocculants are available on the market. The amount of the flocculant to be added is the same as usually prescribed.

The pH adjusting agent to be added to the third chamber 12c is intended to adjust the flocculant system to the pH level befitting the quality of the high-molecular flocculant added to the second chamber. The addition of the pH adjusting agent is made by a method known in the art.

Optionally, the flocculation-flotation tank 12 may be formed with one undivided interior and the three chemical agents may be added thereto all at once. For the addition of the chemical agents to be effected advantageously, it is desirable to add the three chemical agents independently into the separate chambers of the flocculation-flotation tank 12 in the order mentioned.

The treatment performed in the flocculation-flotation tank 12 is similar to the treatment performed in the froth dehydrator 10 in the sense that it is intended to decrease the water content in the separated water-containing oil and lower the consumption of thermal energy in the pressure heater 6 and the evaporator 7 as much as possible. In addition, this treatment is aimed at removing, in a solidified state, the organic substances dissolved in the separated water-containing oil and converting the solidified organic substances into a fuel. Particularly, the addition of the flocculation assistant to the flocculation-flotation tank 12 serves the purpose of markedly enhancing the phenomenon of flocculation. The liquid portion which is discharged from the tank has virtually no oil content. It barely contains a small amount of dissolved impurities, with the COD lowered below 100 ppm. The waste water obtained at this step can be directly subjected to an ordinary sewage treatment.

The separated water-containing oil which has had its water content further decreased in consequence of the flocculation flotation treatment given in the flocculation-flotation tank 12 is now subjected to mechanical dehydration in the dehydrator 14. The oil, thus dehydrated for the third time, is forwarded to the mixing tank 15. The dehydrator 14 may be in the form of a belt press or filter press. Since the flocculation treatment performed in the flocculation-flotation tank 12 is highly efficient, the waste water discharged from the dehydrator 14 contains a very small amount of dissolved impurities similarly to the waste water discharged from the flocculation-flotation tank 12. This waste water, therefore, can be directly subjected to an ordinary sewage treatment. Optionally, the mechanical dehydration by the dehydrator 14 may be omitted. As in the procedure illustrated in FIG. 1, both or either of the froth dehydration and flocculation dehydration may be omitted.

In the mixing tank 15, petroleum or some other similar oil having a relatively high boiling point is added to the separated water-containing oil transferred from the dehydrator 14. This addition of the high-boiling oil serves the purpose of providing fluidity to the oil to be obtained after removal of water in the evaporator 7, as already pointed out in the description of the process of FIG. 1. It is also necessary because the separated water-containing oil, while undergoing the various steps of dehydration mentioned above, loses its fluidity to the extent of rendering the subsequent treatment thereof quite difficult. The amount of this oil to be added is about 1 to 1.5 times (by weight ratio) of the amount of the separated water-containing oil content in the case of the treatment of FIG. 5 in which the water content of the oil is very low. The following steps of treatment can be carried out effectively even if the addition of the oil in the mixing tank 15 is omitted.

When the separated water-containing oil, to which the oil has been added in the mixing tank 15, as described above, is treated in the pressure heater 6 and the evaporator 7 as described with reference to FIG. 1, the additive oil, the oil formed in consequence of the treatment of the separated water-containing oil, and the small amounts of solid substances and residual water accompanying the oil are combined to give rise to a fuel oil, which is forwarded to the thermal carbonizer 16.

In the thermal carbonizer 16, the oil is heated so that the solid substances contained in the oil are carbonized in the absence of air. The inorganic substances contained in the slurry waste are substantially completely removed during the flotation treatment as already pointed out in the description of the process of FIG. 1. The greater part of the solid substances present in the oil are organic substances. When such solid substances are carbonized as described above, the product of carbonization on combustion generates a greater thermal energy than the thermal energy which is generated when the same solid substances are not carbonized but are burnt as a fuel in the process of FIG. 1. Further, the carbonization converts the fibrous organic solid, which causes the viscosity problems of the mixed oil, into a finely divided solid and also converts the mixed oil itself into an oil of a lower molecular weight. Consequently, the mixed oil has its viscosity lowered which renders its handling easy. The temperature of the thermal carbonizer 16 is required to be high enough to provide sufficient carbonization of the organic solid. Generally, it is above 250° C. The thermal carbonizer 16 only operates to provide sufficient carbonization of the organic solid contained in the mixed oil in the absence of air. This carbonization of the organic solid in the absence of air is not always limited to the carbonization of the organic solid in the oil described above. Instead, it may be effected by omitting the incorporation of the additive oil in the mixing tank 15 and heating the residue resulting from the removal of water from the separated water-containing oil in the atmosphere of an inert gas. It is nevertheless more convenient to add an ample amount of a high-boiling oil either to the mixing tank 15 or after removal of water from the separated water-containing oil and subject the organic solid in the oil to carbonization in the presence of the additive oil. During the thermal carbonization, the oil under treatment liberates an oil of a relatively low boiling temperature. It is desirable to use a suitable device to prevent the liberated low-boiling oil from reaching the ambient air.

Besides the effect described above, the thermal carbonization is found to separate residual inorganic substances by precipitation and effect chemical formation of a new oil component at the elevated temperature. The formation of this new oil component is believed to be possibly accelerated by the activation of the small amount of residual water upon exposure to the elevated temperature.

The oil which has undergone the thermal carbonization may be used in its unaltered form as a fuel. Since it has a lowered viscosity, it may be used cyclically as the additive oil in the mixing tank 15. With a view to heightening the efficiency of treatment in the pressure heater 6, the additive oil for use in the mixing tank 15 is desired to be heated in advance. The oil freshly discharged from the thermal carbonizer is still hot. Adoption of this oil as the additive oil in the mixing tank 15, therefore, permits omission of the trouble involved in the preheating. The thermally carbonized oil may be forwarded to a solid-liquid separator 18 such as a centrifugal separator, and separated thereby into the carbonization product and the residual oil, accumulated respectively in the oil tank 8 and the carbonized fuel tank 19, and used independently as fuels. Otherwise, the oil finally separated may be used as the additive oil for the mixing tank 15. The separated carbonization product with oil adhering thereto may be burnt as the fuel in the sludge boiler 9. Optionally, the carbonization product may be freed from the adhering oil by use of a solvent and then used as a carbonized fuel.

Figure 5:
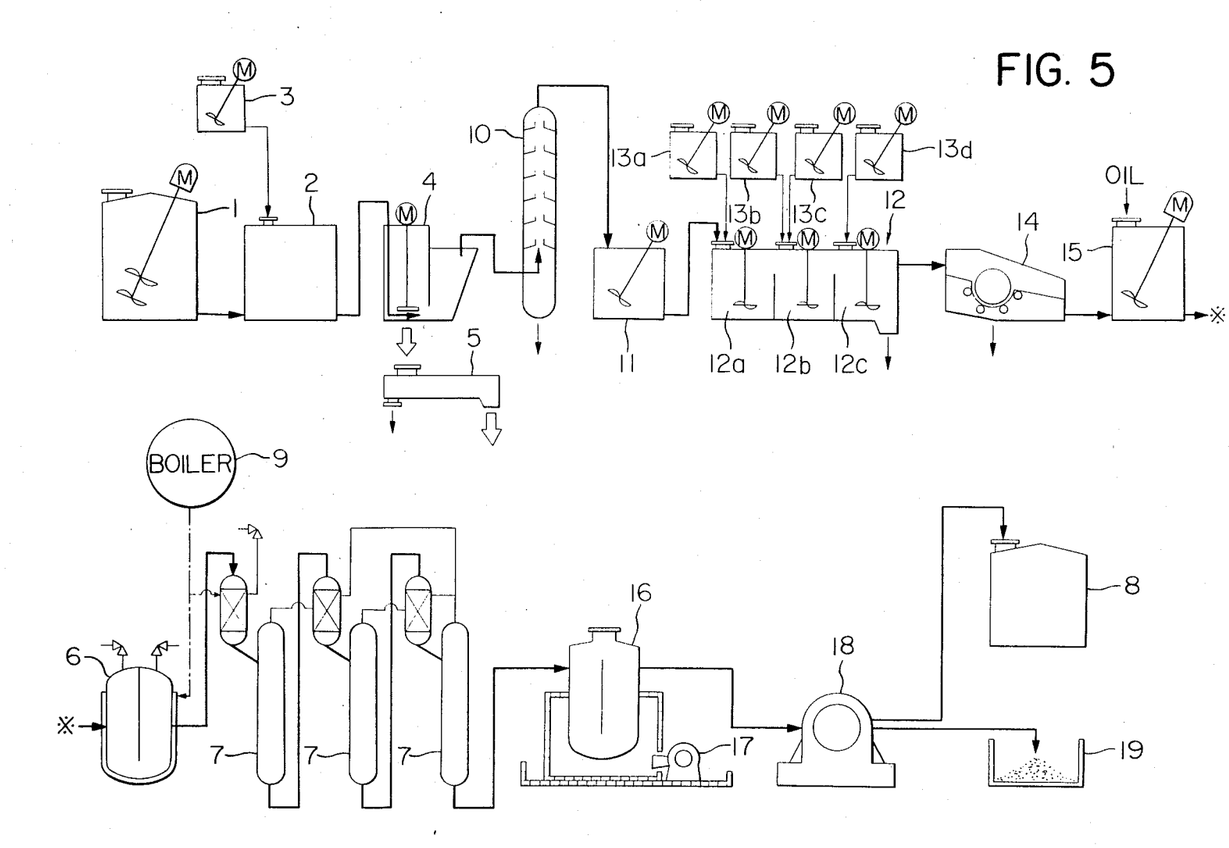
FIG. 5 is a process diagram showing the procedure for more efficiently carrying out the basic treatments of FIG. 1.

According to the process illustrated in FIG. 5, since the separated water-containing oil to be treated in the pressure heater 6 and the evaporator 7 has a low water content, the thermal energy consumed in the two steps of treatment mentioned above can be lowered proportionally. Further, the organic solid contained in the separated water-containing oil is carbonized in the thermal carbonizer 16 and the carbonization product is utilized by itself as a fuel. Thus, the oil obtained by the method of the present invention from the oil-containing slurry waste has an increased value as a fuel.

EXAMPLE 1

Figure 1:
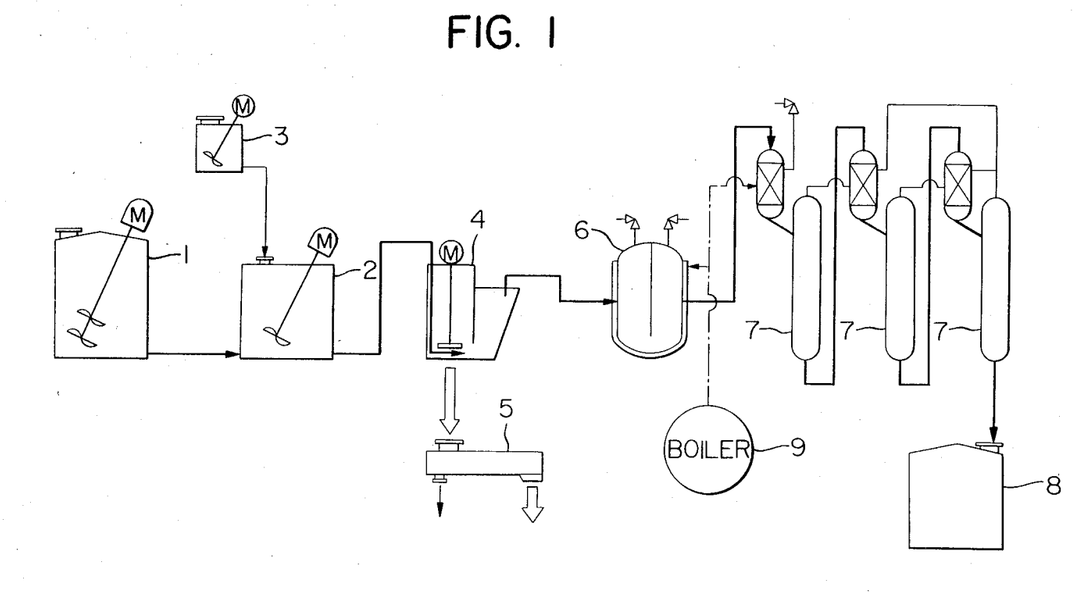
FIG. 1 is a process diagram showing the basic procedure of treatments involved in the present invention.
Figure 6:
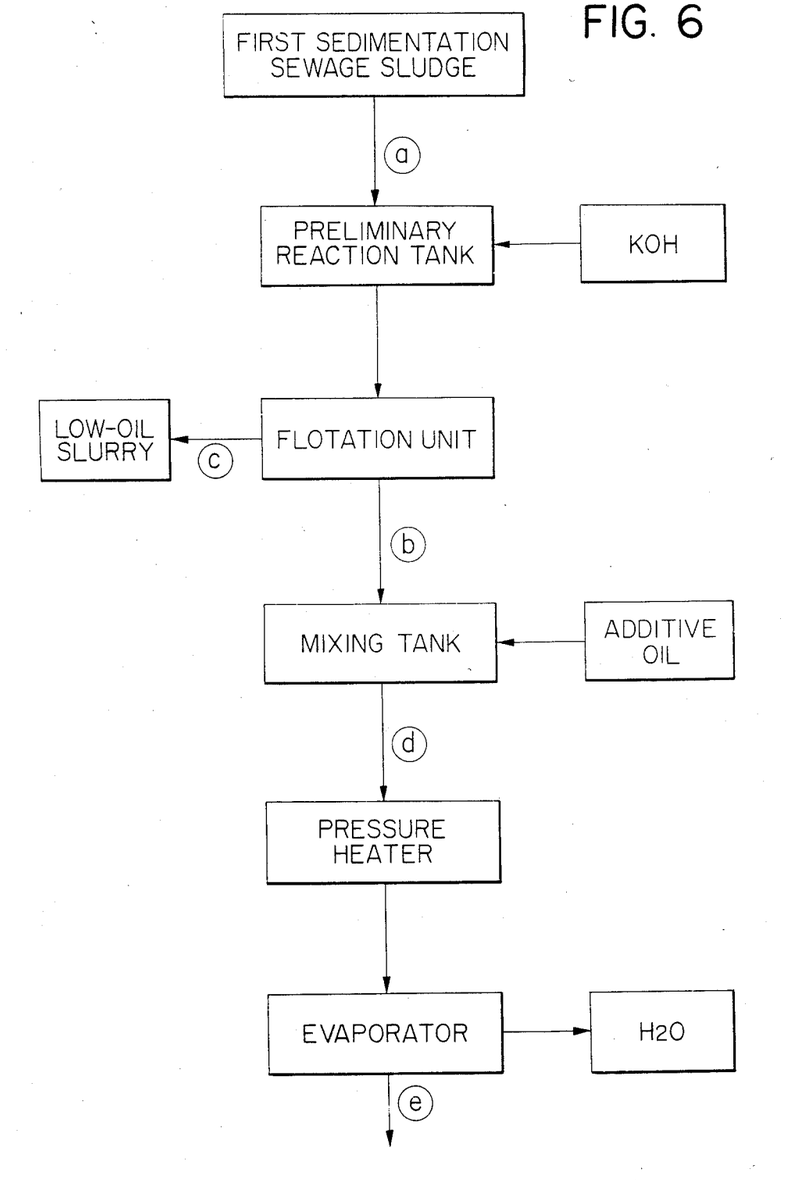
FIG. 6 is a flow sheet of the operation involved in Example 1.

A first sedimentation sewage sludge was treated by the procedure illustrated in FIG. 1. The flow sheet of the operation is illustrated in FIG. 6. The products of the successive steps of treatment obtained at the positions (a) through (e) of the diagram of FIG. 6 were analyzed. The results are shown in Table 4.

The KOH solution added to the preliminary reaction tank was prepared by dissolving 0.035 ton of KOH in 0.105 ton of water. The pressure heating was carried out under the conditions of 110° C. of temperature and 2 kg/cm$^2$ of pressure. The evaporation was conducted under the conditions of 80° C. of temperature and 50 mmHg of vacuum. 5.2 tons of a recovered oil, obtained by subjecting the same sludge to the procedure of this example.

To the slurry which had its oil content lowered by the flotation unit and had been discharged from the system, 20 percent/D.S. of calcium hydroxide, 0.4 percent/D.S. of anion polymer, and 0.6 percent/D.S. of cation polymer were added as dehydration assistants. The resultant mixed slurry was dehydrated by a screw press. Consequently, the water content was lowered to about 68 percent. The water squeezed out of the slurry of low oil content had 17 ppm of BOD and 6 ppm of smelt sludge (S.S.).

The low-oil slurry dehydrated, as described above, was adjusted to a water content of about 50 percent by the addition of about 60 tons of fermented compost having a water content of about 30 percent. Then, it was subjected to a fermentation treatment under aerobic conditions. The fermentation proceeded favorably.

The time required for the treatment consisted of about 10 minutes spent in the preliminary reaction tank, about 10 minutes in the flotation unit, about 10 minutes in the mixing tank, about 30 minutes in the pressure heater, and about one day in the evaporator. From the evaporator, a total of 21.53 tons of water was vaporized. The oil consumed for the pressure heating treatment and the evaporation treatment was about 2 tons. The oil produced by the treatment could be burnt advantageously in the sludge boiler. The calorific value of this oil was about 6970 Kcal/kg.

TABLE 4

| Analysis | | Position in FIG. 6 | | | | |
|---|---|---|---|---|---|---|
| | | (a) | (b) | (c) | (d) | (e) |
| Gross amount (tons) | | 100 | 23 | 77 | 28 | 6.65 |
| Water content (tons) | | 96 | 21.6 | 74.4 | 21.6 | 0.07 |
| D.S. | Organic content other than oil (tons) | 1.61 | 0.72 | 0.99 | 0.72 | 0.62 |
| | Oil content (tons) | 0.6 | 0.48 | 0.12 | 0.48 | 0.48 |
| | Inorganic content (tons) | 1.79 | 0.28 | 1.51 | 0.28 | 0.28 |
| | Additive oil (tons) | — | — | — | 5.2 | 5.2 |

EXAMPLE 2

Figures 7, 7B:
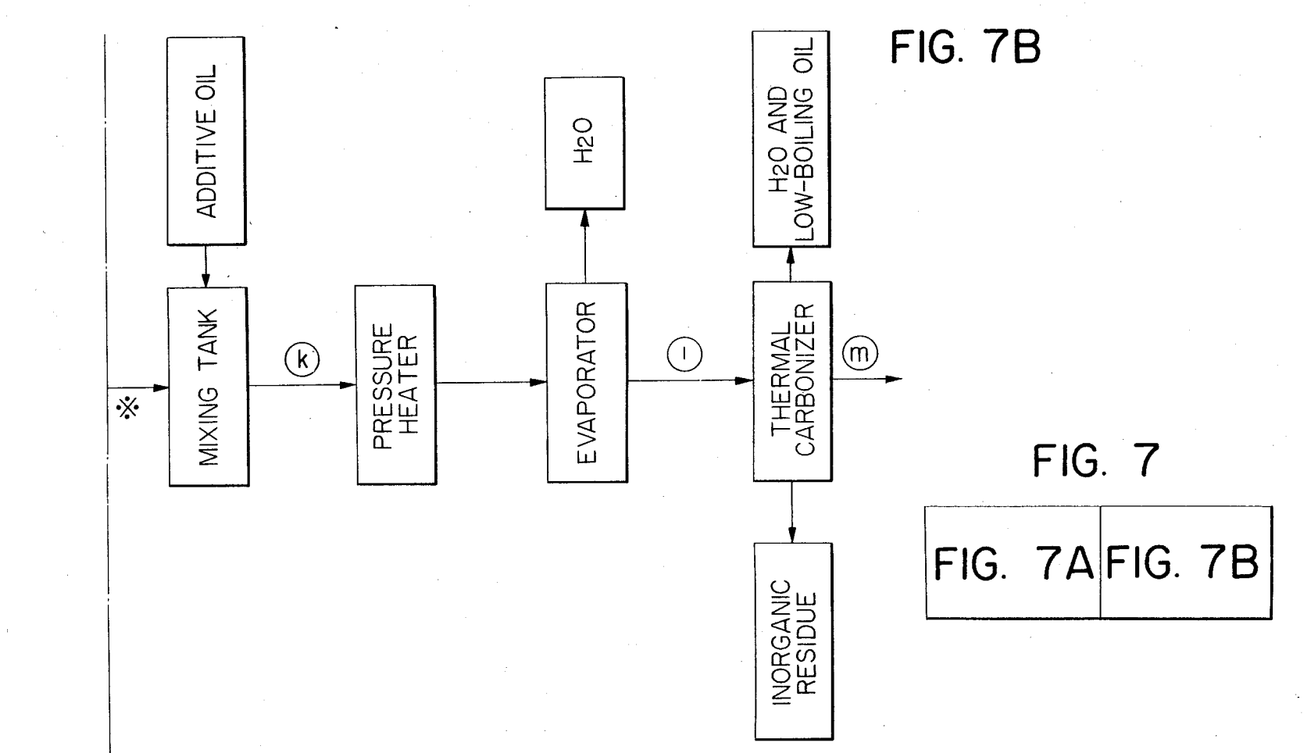
FIG. 7, FIG. 7A, and FIG. 7B are flow sheets of the operation involved in Example 2.
Figure 7A:
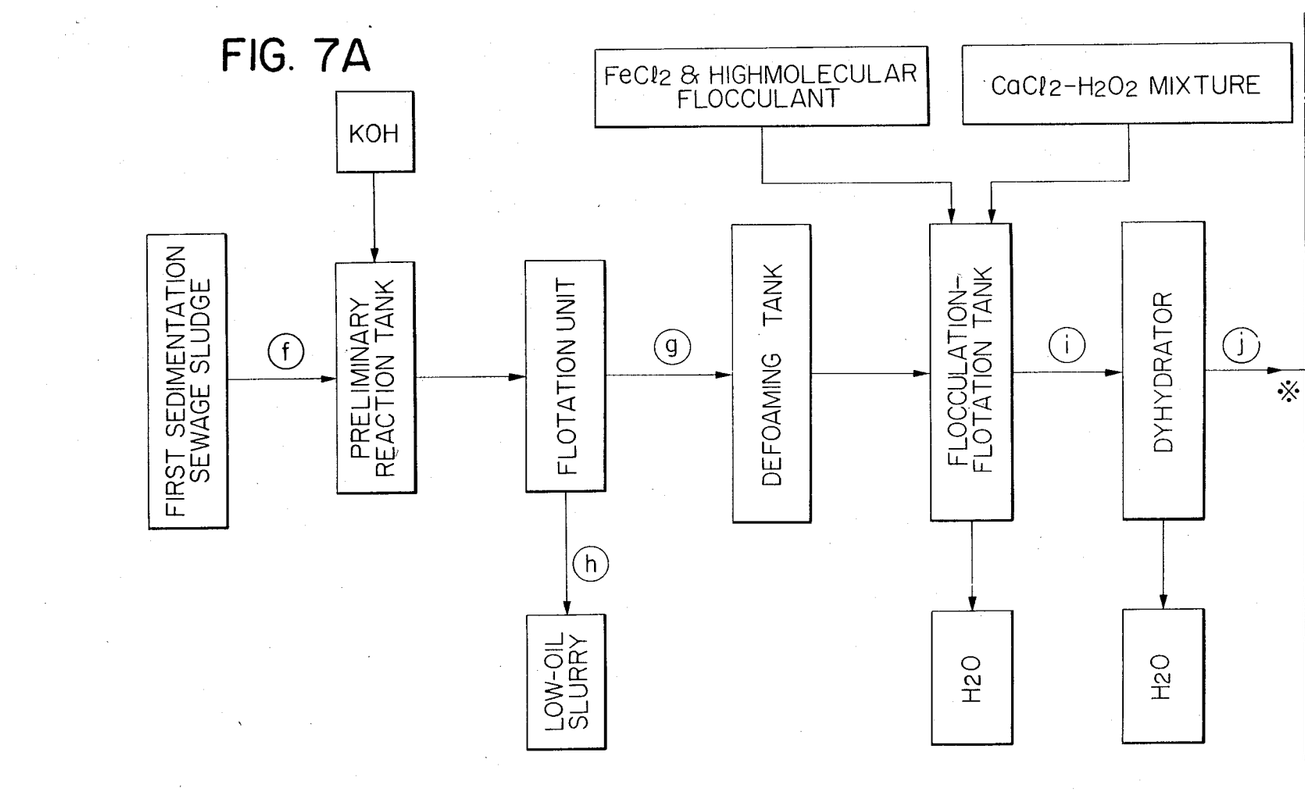

The same first sedimentation sewage sludge as used in Example 1 was treated by the procedure of FIG. 5 omitting the steps of treatment by the froth dehydrator and the final solid-liquid separator. The flow sheet of the operation is illustrated in FIG. 7. The products of the successive steps of treatment obtained at the positions (f) through (m) indicated in the diagram of FIG. 7 were analyzed and the results are shown in Table 5.

The KOH solution added to the preliminary reaction tank and the conditions of the pressure heating treatment and the evaporation treatment were the same as those of Example 1. The thermal carbonizer was operated at a temperature of about 300° C. To the flocculation-flotation tank, FeCl$_2$ prepared as a 37% aqueous solution was added to a concentration of 500 ppm based on the separated water-containing oil content, a high-molecular flocculant prepared as a 0.5% aqueous solution to a concentration of 0.3 percent based on the separated water-containing oil content, and a 35% hydrogen peroxide solution added with 20% of CaCl$_2$ to a concentration of 1000 ppm based on the separated water-containing oil content. 4.93 tons of a carbonized product-containing oil obtained by subjecting the same sludge to the procedure of the present example was used as an additive oil.

The low-oil slurry which had its oil content lowered by the flotation unit could be easily subjected to the same fermentation treatment as in Example 1.

The time required for the treatment consisted of about 10 minutes spent in the preliminary reaction tank, about 10 minutes in the flotation unit, about 10 minutes in the mixing tank, about 30 minutes in the flocculation-flotation tank, about 10 minutes in the dehydrator, about 10 minutes in the mixing tank, about 30 minutes in the pressure heater, about eight hours in the evaporator, and about 30 minutes in the thermal carbonizer. The water discharged from the flocculation-flotation tank and that from the dehydrator were each about 9 tons, contained absolutely no oil, and had about 95 ppm of COD. From the evaporator, a total of about 3.5 tons of water was vaporized. When the vaporization product from the thermal carbonizer was cooled, 0.07 tons of water and about 0.17 tons of a compound of water and carbon dioxide were obtained. Within the thermal carbonizer, inorganic substances were separated as a precipitate. The carbonization product-containing oil consequently obtained could be used in its unaltered form as a good fuel. The calorific value of this oil was about 9240 Kcal/kg. The amount of oil consumed for the removal of water by the pressure heating treatment and the evaporation treatment and for the thermal carbonization treatment was about 400 kg.

TABLE 5

| Analysis | | (f) | (g) | (h) | (i) | (j) | (k) | (l) | (m) |
|---|---|---|---|---|---|---|---|---|---|
| Gross amount (tons) | | 100 | 23 | 77 | 13.97 | 4.93 | 9.86 | 6.383 | 5.866 |
| Water content (tons) | | 96 | 21.6 | 74.4 | 12.59 | 3.55 | 3.55 | 0.073 | |
| D.S. | Organic content other than oil (tons) | 1.61 | 0.62 | 0.99 | 0.62 | 0.62 | 0.62 | 0.62 | 0.437** |
| | Oil content (tons) | 0.6 | 0.48 | 0.12 | 0.48 | 0.48 | 0.48 | 0.48 | 0.48 / 0.019* |
| | Inorganic content (tons) | 1.79 | 0.28 | 1.51 | 0.28 | 0.28 | 0.28 | 0.28 | — |
| Additive oil (tons) | | — | — | — | — | — | 4.93 | 4.93 | 4.93 |

*Oil formed newly by heating
**Carbonization product

COMPARATIVE EXAMPLE

To about 65 tons of the same first sedimentation sewage sludge as used in Example 1 (substantially the same amount as the low-oil slurry obtained after the step of dehydration in the procedure of Example 1), 36 percent/D.S. of calcium hydroxide, 0.6 percent/D.S. of anion polymer, and 0.9 percent/D.S. of cation polymer were added as dehydration assistants. The resultant slurry mixture was dehydrated by a screw press. Despite use of larger amounts of dehydration assistants than in Example 1, the water content was lowered only to 78.5 percent. The water squeezed by the press had 50 ppm of BOD and 10 ppm of S.S.

In order for the water content of the dehydrated sludge to be lowered to 50 percent, it was necessary to add thereto about 92 tons of the fermented compost having a water content of 30 percent.

What is claimed is:

1. In the treatment of an oil-containing waste slurry containing sewage sludge, human or animal excrement, household waste, or industrial organic effluents from food processing or wool scouring plants, or mixtures of these materials, a method for separating an oil component from said oil-containing waste slurry comprising the steps of:
   adding a saponifying agent to the waste slurry to saponify part of the oil or fat contained therein;
   stirring the waste slurry containing the thus-formed soap to effect foaming of the waste slurry, whereby the remaining oil component adheres to the foam and rises to the surface of the waste slurry due to buoyancy; and
   separating the foam to which the oil component adheres from said waste slurry so that said waste slurry is converted to a slurry with a low oil content, wherein said separated foam to which the oil component adheres is in the form of a water-containing oil component, wherein said saponifying agent is selected from the group consisting of potassium hydroxide and sodium hydroxide in an amount of 1/100 to 1/30 parts by weight based on the amount of the organic substances present in the waste slurry.

2. The method according to claim 1, wherein the slurry with a low oil content is subjected to dehydration and then fermentation.

3. The method according to claim 1, wherein potassium hydroxide or sodium hydroxide is added to the slurry waste as the saponifying agent in the amount of 1/60 to 1/70 parts by weight based on the amount of organic substances present in the waste slurry.

4. The method according to claim 1, further comprising the steps of:
   heating the water-containing oil component to 105°–120° C. to produce oil by the decomposition of oleic compounds in the water-containing oil component; and
   removing water from the heated water-containing oil component by evaporation to produce a fuel oil.

5. The method according to claim 4, wherein the water-containing oil component is dehydrated prior to the heating step.

6. The method according to claim 5, wherein the dehydration of the water-containing oil component is conducted by effecting flocculation and flotation of solid substances in the water-containing oil component, separating the flocculated and raised solid substances from the water containing oil component, and subjecting the water-containing oil component, from which solid substances have been removed, to mechanical dehydration.

7. The method according to claim 6, wherein flocculation is effected by the addition of a flocculant comrising a mixture of a hydrogen peroxide solution and a metal salt used in conjunction with a metal salt and a high-molecular flocculant.

8. The method according to claim 7, wherein the water-containing oil component is subjected to a defoaming treatment before the step of adding said flocculant.

9. The method according to claim 4, wherein an additive oil is added to said water-containing oil component before the heating step.

10. The method according to claim 9, wherein the additive oil is a high boiling oil having a boiling point of at least 200° C.

11. The method according to claim 9 or claim 10, wherein the additive oil is the fuel oil produced by the evaporation of water from the heated water-containing oil component.

12. The method according to claim 9 or claim 10, wherein the additive oil is a petroleum oil.

13. The method according to claim 9, wherein said step of removing water, by evaporation, from said water-containing oil component is conducted under a vacuum.

14. The method according to claim 13, wherein the oil obtained after the removal of the water by vaporization is heated, in the absence of air, to effect carbonization of organic solids contained in the oil.

15. The method according to claim 14, wherein the carbonized organic solids are separated from the oil.

16. The method according to claim 9, wherein the oil obtained after the removal of the water by vaporization is heated, in the absence of air, to effect carbonization of organic solids contained in the oil and the oil containing the resultant carbonization product is cyclically used as the additive oil.

17. The method according to claim 9, wherein the oil obtained after the removal of the water by vaporization is heated, in the absence of air, to effect carbonization of organic solids contained in the oil, the carbonized organic solids are separated from the oil, and the oil, from which carbonized organic solids have been separated, is cyclically used as the additive oil.

* * * * *